May 3, 1955
U. LAMM ET AL
2,707,765
MEANS FOR SQUARE SUMMATION OF THE INSTANTANEOUS
VALUES OF TWO ELECTRIC QUANTITIES
Filed March 27, 1953
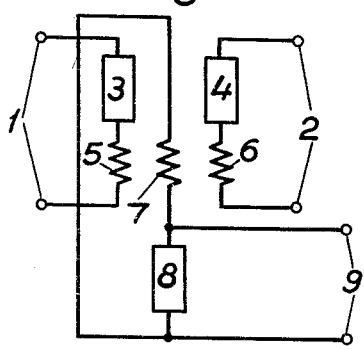
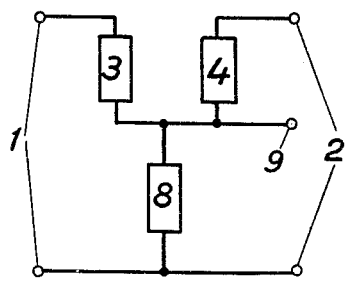
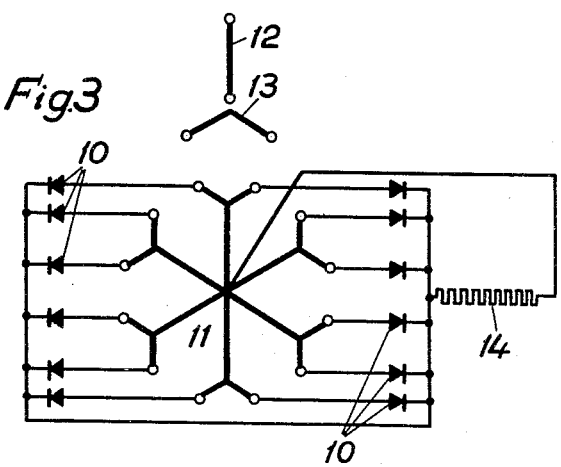
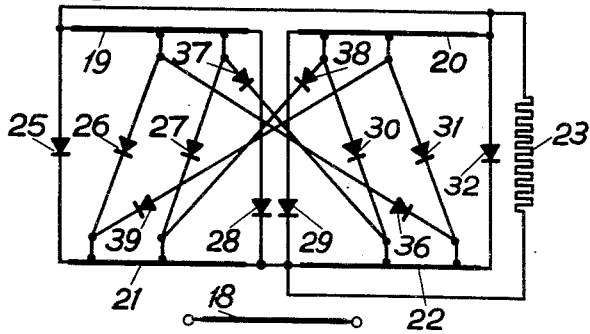
Inventors.
Uno Lamm and
Erich Uhlmann
By (signature)
Attorney.

United States Patent Office 2,707,765
Patented May 3, 1955

2,707,765

MEANS FOR SQUARE SUMMATION OF THE INSTANTANEOUS VALUES OF TWO ELECTRIC QUANTITIES

Uno Lamm and Erich Uhlmann, Ludvika, Sweden, assignors to Allmanna Svenska Elektriska Aktiebolaget, Vasteras, Sweden, a Swedish corporation Application March 27, 1953, Serial No. 345,162

Claims priority, application Sweden March 29, 1952

8 Claims. (Cl. 321—8)

If two such electrical quantities are given, which either are constant during a comparatively long time, e. g. direct currents or direct current voltages, or vary according to a simple sine function, e. g. simple alternating currents or voltages, it is a comparatively simple matter to obtain from said quantities a third one which represents the square root of the sum of the squares of the two first-named quantities (for the sake of shortness, referred to as their square sum). Sometimes, however, the problem is presented to derive such a square sum from the instantaneous values of quantities which form a more irregular function of time, and the present invention affords a solution of this problem. The invention consists principally in impressing the two first-named quantities on conductors of at least in part non-linear character from which the square sum is derived.

Four forms of the invention are diagrammatically illustrated in Figs. 1–4 of the accompanying drawing.

In Fig. 1, 1 and 2 represent two pairs of terminals, between which two voltages are intended to be impressed, the square sum of which is to be derived. Between the terminals 1 a voltage dependent resistor 3 is connected and between the terminals 2 a similar resistor 4. Each of the resistors is of a type which admits, within the measuring limits of interest, a current which is practically proportional to the square of the impressed voltage. Such types of resistors are well-known per se. In this form it is supposed that the voltages and thereby the currents vary—periodically or more irregularly—at such a speed that their instantaneous values can be reproduced by current transformers. Two primary windings 5, 6 of a common current transformer are therefore connected in series with the resistors 3, 4. These primary windings co-operate with a common secondary winding 7, which thus will carry a current proportional to the sum of the currents in the two primary windings (at equal winding turn numbers equal to the said sum). This total current is led through a third voltage dependent resistor 8 of the same character as the resistors 3, 4, and the voltage across the resistor 8 is tapped through a pair of terminals 9.

By reason of the character of the voltage dependent resistors, the currents in the two primary windings of the current transformer will be proportional to the squares of the voltages on the two pairs of terminals 1 and 2. The common secondary winding will carry the sum of these squares, and the voltage across the resistor 8 will therefore be proportional to the square root of this sum.

If the currents through the current-dependent resistors have not such a time course as to be suitably copied by current transformers, or if the latter are not economically warranted, the connection according to Fig. 2 may be used instead of that of Fig. 1. In Fig. 2 the currents through the resistors 3 and 4 which represent the squares of the primary voltages are directly combined in the resistor 8. In both forms according to Figs. 1 and 2 it is, however, important that the resistor carrying the total current is so dimensioned as to absorb at the said current only a small fraction of the primary voltages, since it lies directly or inductively in series with the resistors 3 and 4 between the said voltages. The square sum voltage, which therefore will be on another scale than at primary voltages, is absorbed across the resistor 8, i. e. between the terminal 9 and one of the terminals 1 or 2.

In Figs. 3 and 4, two forms are shown in which the non-linear character of the circuits is created by means of unidirectional valves. In Fig. 3, these valves 10 are twelve in number and form together with a twelve-phase secondary winding 11 of a transformer to which they are connected, a symmetrical twelve-pulse current converter. The primary winding of the transformer consists of only two phase windings 12, 13, one 13 of which is, however, divided between two cores or core legs of the transformer. On these two phase windings, the two primary voltages are impressed, the square sum of which shall be created, and the windings are so dimensioned that if the two impressed voltages are equal, sine-shaped and displaced in phase by 90°, all the core legs are preferably equally highly magnetized. The cathodes of all the valves 10 connected to the secondary winding are directly connected together, and the secondary voltage is taken out between them and the neutral point of the secondary winding and may be impressed on a resistor 14. This voltage will then be a direct current voltage of the type normal in symmetrical multipulse rectifiers and represents the square sum of the primary voltages.

Although there is no guarantee that the mutual phase position of the voltage components will be that shown in the figure, and although the mutual proportion between the two impressed primary voltages may vary, the resultant secondary voltage will for a high number of pulses oscillate rather little about a value which is proportional to the square sum of the two primary voltages, as will be shown hereinafter. If the two voltages impressed on the primary have arbitrary instantaneous values, the proportion between them can, however, always be put as the tangent of a certain angle $x$, i. e. one voltage $e_1$ can be put equal to $e \sin x$ and the other $e_2$ equal to $e \cos x$. If the voltages contain no direct current component so as to be transferable by transformer action, the voltage $e_3$ across a certain secondary phase can then be set $=e \sin (x+y)$, where $y$ for symmetrical sine-shaped primary voltages designates the angular difference between the phase on which the voltage $e \sin x$ is impressed, and the aforesaid secondary phase, while $y$ in the general case designates a fictitious angle, the tangent of which is equal to the proportion between the two transformer ratios from each of the primary voltages to the secondary voltage, which proportion is independent of the character of the impressed voltages.

Since the connection is a pure current converter connection which neither consumes nor adds any appreciable energy even temporarily, the power delivered will be equal to that supplied, i. e.

$$e_1 i_1 + e_2 i_2 = e_3 i_3$$

if $i_1 i_2 i_3$ are the currents corresponding to $e_1 e_2 e_3$. From the aforesaid values of $e_1 e_2 e_3$ the following may be derived $$e i_1 \sin x + e i_2 \cos x = e i_3 (\sin x \cos y + \cos x \sin y)$$

and since the two primary voltage components have been supposed to be independent of one another, the following is derived therefrom $$\frac{i_1}{i_3} = \cos y;\ \frac{i_2}{i_3} = \sin y$$

Introducing these values in the power equation given above, we obtain $$e_3 = e (\cos x \cos y + \sin x \sin y)$$

The aforesaid expression for the secondary voltage will be a maximum for $y = x$, and it will then be $=e$, which quantity also according to the aforesaid represents the square sum of the two impressed primary voltages. Of all the valves connected in parallel on the cathode side that one will thus carry current which lies next to the value $y=x$, and if the number of secondary phases is made sufficiently great, the fluctuations in the secondary voltage will be small as usual in multipulse current converters.

Fig. 3 shows only a single example of the use of a symmetrically multipulse current converter connection for the square summation, but each such connection can be used for the purpose. For instance a device of a known kind for creating a higher number of pulses than that corresponding to the number of valves may be used, for instance of the general type described in the Swiss Patent 210,022.

Fig. 4 shows a connection which differs from that of Fig. 3 in two essential respects. First, it uses only two transformer cores, whence its transformer is closely allied to one having a two-phase primary winding. Secondly, the unidirectional valves are connected between the two secondary windings carried by different cores and between particularly selected points of these windings.

The two primary windings of the transformer are in Fig. 4 designated by 17, 18. With the primary winding 17, two secondary windings 19, 20 co-operate, the outer terminals of which are connected together, and with the primary winding 18 two secondary windings 21, 22 co-operate, the inner terminals of which are connected together. Between the two pairs of secondary windings, the voltage is tapped, for instance across a load resistor 23.

Starting for instance from the secondary winding 19, it is found that the left end thereof—directly connected to the resistor 23—is connected through a valve 25 with the left end of the secondary winding 21, which is most distant from the resistor 23. An analysis shows that this valve 25 obtains the highest voltage and thus will be active when the voltage across the winding 19 is very low compared with the voltage across the winding 21.

The next tap on the secondary winding 19 lies at a distance from its left end which in the example shown is 0.5 of the length of the winding and is connected through a valve 26 with a point on the winding 21 which lies $\sqrt{1-(0.5)^2}=0.866$ of the length of this winding, counted from its right end connected to the resistor 23. This valve obtains the highest voltage of all when the voltage across the secondary winding 19 has the same proportion to the voltage across the secondary winding 21 as 0.5 to 0.866 or nearly so. The sum of the voltage across the secondary winding parts thus connected in series will then be proportional to $\sqrt{(0.5)^2+(0.866)^2}$, i. e. to the square root of the sum of the squares of the two total secondary voltages which in their turn are proportional to the primary voltages.

The next tap on the secondary winding 19 lies about 0.866 of the winding length from its left end and is connected through a valve 27 with a point on the winding 21 which lies at 0.5 of the winding from its right end. In analogy with the valve 21 the valve 27 will then be active when the proportion between the voltages on the secondary windings 19 and 21 is of the order of magnitude 0.866:0.5, and the sum voltage will then be proportional to $\sqrt{(0.866)^2+(0.5)^2}$.

Finally, the right end of the winding 19 is connected to the right end of the winding 21 through a valve 28, which enters into action when the voltage across 21 is negligible as compared with the voltage across 19.

The reason why the valve which is closest to the square sum of the two voltages enters into function is due to the fact that the taps connected by a valve are so chosen that the sum of the squares of the fractions expressing the proportions between the active winding portions and the entire winding is made equal to 1 or, in other words, that the said proportion can represent cosine and sine of the same angle, which may be designated by $x$. If then the proportion between the two secondary voltages are expressed as a proportion between cosine and sine (i. e. the cotangent) for another angle $y$, which is always possible, the voltage obtained and influencing the valve will always be proportional to $\cos y \cos x + \sin y \sin x = \cos(y-x)$.

This expression will be a maximum $=1$ when $y=x$, and if this condition cannot be exactly fulfilled by reason of the limited number of taps, it will be a maximum when the difference between $y$ and $x$ is the smallest possible. That valve will therefore always be active for which the proportion between the winding lengths series connected by the valves correspond as closely as possible to the proportion between the total secondary voltages. The latter ones are in their turn proportional to the primary voltages.

A condition for the voltage obtained in the just mentioned way lying close to the real square sum is not only that the proportions between the active winding portions and the entire windings represent cosine and sine of the same angle $x$ but also that the taps are so chosen that the steps between the values of the aforesaid angle $x$ which correspond to taps connected by valves are essentially equal and not too large. In the example chosen the first pair of taps, i. e. the ends of the windings connected by the valve 25, represents the angle 0. The following pair of taps, where 0.5 of the winding 19 is connected in series with 0.866 of the winding 21 through the valve 26, represents the angle 30°, the sine of which is 0.5 and cosine 0.866. In the same manner, the next pair of taps connected together by the valve 27 represents the angle 60°, and the ends connected together by the valve 28 represent 90°. By this angularly symmetrical and rather dense distribution of the pairs of taps, a maximum error in the square sum of only a little over 3% is obtained, as a calculation shows. Generally the condition of angular symmetry may be expressed in such manner that the steps between the angles representing the arc tangent of the proportions between the two series connected winding portions should be essentially equal. In this manner, the connection shown in Fig. 4 will in fact also represent a symmetrical current converter connection, although it is less evident in this respect than in the case of the connection according to Fig. 3.

If the voltages to be combined can assume alternately positive and negative values, which is often the case, the secondary windings should also be connected crosswise by valves. In Fig. 4 there is thus shown how the same tap on the winding 19, which is connected with a tap on the winding 21 by the valve 26, is also connected with a symmetrically placed tap on the winding 22 by a valve 36, and also how the tap connected to the valve 27 is connected with a tap on the winding 22 by a valve 37. In the same manner, taps on the winding 20 are connected not only with taps on the corresponding winding 22 by valves 29, 30, 31, 32, but also with taps on the opposite winding 21 by valves 38, 39.

The windings 19, 20, 21, 22 in Fig. 4 may also be replaced by potentiometric resistors, which is particularly important in the case that the voltages to be combined consist entirely or partly of direct current voltages. Even if they originally consisted of alternately current voltages, they could first be rectified in special rectifiers and then impressed on potentiometric resistors connected substantially as the secondary windings in Fig. 4. In this case, as otherwise when the impressed valves do not change their directions, only resistors for one direction are as a rule necessary, corresponding for instance to the windings 19 and 21 in Fig. 2.

We claim as our invention:

1. Means for creating an electric quantity the instantaneous value of which is practically proportional to the square root of the sum of the squares of the instantaneous values of two other electrical quantities, comprising two conductors of at least partially non-linear characteristic on which the last-mentioned quantities are impressed and from which the first-named quantity is derived, said conductors essentially consisting of voltage-dependent resistors containing elements of unidirectional valve character as essential constituents, and an essentially symmetrical multipulse current converter connection, in which the component quantities to be combined, appearing as voltages, are impressed on two different phases, while the resultant quantity is tapped as a direct current voltage in the manner common in such connections.

2. Means according to claim 1, in which the phases on which the component voltages are impressed occupy a symmetrical two-phase position with respect to the valve winding of the converter.

3. Means according to claim 1, in which the resultant quantity is tapped between a transformer neutral and the common cathode means of the converter.

4. Means according to claim 1, in which the resultant quantity is tapped between the ends of two windings, intermediary points of which are mutually connected together through unidirectional valves.

5. Means according to claim 4, in which the intermediary points are so chosen that the proportions between the winding portions connected in series through the valves and the entire windings substantially satisfy the condition that the sum of the squares of said proportions is equal to unity.

6. Means according to claim 5, in which the intermediary points are also so chosen that the steps between the angles forming arc tangents for the proportion between the winding portions connected in series through said valves will be essentially equal and of moderate values.

7. Means according to claim 4, in which the windings consist of potentiometric resistors.

8. Means according to claim 4, in which separate windings represent different directions of the voltages to be combined.

References Cited in the file of this patent

UNITED STATES PATENTS

| | | |
|---|---|---|
| 1,094,733 | Lyle | Apr. 28, 1914 |
| 1,325,889 | Curtis | Dec. 23, 1919 |
| 1,784,004 | Geiger et al. | Dec. 9, 1930 |
| 1,850,587 | Joffe | Mar. 22, 1932 |
| 2,356,269 | Potter | Aug. 22, 1944 |
| 2,413,033 | Potter | Dec. 24, 1946 |